United States Patent [19]

Jons et al.

[11] Patent Number: 4,666,694
[45] Date of Patent: May 19, 1987

[54] METHOD FOR TREATING BY-PRODUCTS FROM FLUE GAS

[75] Inventors: Ebbe S. Jons, Vaerløse; Erik Liborius, Hellerup, both of Denmark; Preston L. Veltman, Severna Park, Md.; Krishnakant N. Vernenkar, Ballerup, Denmark

[73] Assignee: A/S Niro Atomizer, Soborg, Denmark

[21] Appl. No.: 719,161

[22] Filed: Apr. 2, 1985

[30] Foreign Application Priority Data

Apr. 12, 1984 [DK] Denmark .............................. 1897/84

[51] Int. Cl.$^4$ .......................... C01F 11/46; C01F 1/00; C01F 5/40; C01B 17/00
[52] U.S. Cl. .................................... 423/555; 423/166; 423/242
[58] Field of Search ............... 423/242 A, 242 R, 166, 423/244 R, 244 A, 555

[56] References Cited

U.S. PATENT DOCUMENTS

| 3,533,748 | 10/1970 | Finfer et al. | 23/226 |
| 4,024,220 | 5/1977 | Ostroff | 423/242 |
| 4,081,513 | 3/1978 | Moss | 423/244 |
| 4,478,810 | 10/1984 | Bloss et al. | 423/242 X |
| 4,495,162 | 1/1985 | Jons et al. | 423/555 X |
| 4,495,163 | 1/1985 | Nguyen | 423/242 |
| 4,544,542 | 10/1985 | Angevine et al. | 423/555 |
| 4,595,576 | 6/1986 | Andreasen et al. | 423/555 X |

FOREIGN PATENT DOCUMENTS 0074258 9/1982 European Pat. Off. .
1369402 3/1973 United Kingdom .

Primary Examiner—Gregory A. Heller
Attorney, Agent, or Firm—Banner, Birch, McKie & Beckett

[57] ABSTRACT

A dry particulate sulfite-containing material produced in a flue gas desulfurization process is oxidized and agglomerated in a fluidized bed reactor, wherein the material is fluidized in an oxygen-containing gas. The oxygen-containing gas which is supplied to the fluidized bed has a temperature below the agglomeration temperature of said particulate material. Due to the exothermic character of the oxidation, the temperature of the fluidized bed is maintained above the agglomeration temperature of the particulate material. Gas with entrained particles leaving the fluidzed bed are cooled during its passing through the freeboard of the fluidized bed reactor, whereby problems due to sticking of said entrained particles are avoided. At least a part of said entrained particles are recycled to the fluidized bed reactor.

A fluidized bed reactor is provided suitable for performing the combined oxidation and agglomeration.

12 Claims, 5 Drawing Figures

METHOD FOR TREATING BY-PRODUCTS FROM FLUE GAS

BACKGROUND OF THE INVENTION

The present invention relates to by-products that are produced in flue gas desulfurization (FGD) processes using alkaline earth metal compounds, e.g. calcium hydroxide, as absorbent. Such products usually contain substantial amounts of alkaline earth metal sulfites. The sulfite contents make the products less suitable for disposal in some locations and also impede possible industrial use for the products.

More specifically the present invention relates to a process of converting sulfite, e.g. calcium sulfite, in FGD by-products into calcium sulfate thereby making the by-products more acceptable for disposal to the environment and more suitable for industrial use e.g. for mixing with cement.

Most FGD processes utilize a basic absorbent and may be either regenerative where the spent absorbent is regenerated for reuse in the process or non-regenerative processes where the spent absorbent is disposed of as land fill, or utilized industrially for other purposes.

In the latter type of FGD processes alkaline earth metal compounds, particularly calcium hydroxyde and calcium carbonate, have found wide use as absorbents, and whether the FGD process is carried out by wet scrubbing, spray dryer absorption or cleaning with dry particulate absorbent, the spent absorbent will contain substantial amounts of sulfite. Dependant on the FGD process used and the extent to which fly ash present has been separated from the flue gas prior to the FGD process the spent absorbent may further contain various amounts of fly ash.

The sulfite may be converted into sulfate by various oxidation processes. When the spent absorbent is a dry particulate material, oxidation may be carried out in the dry state by bringing the material in contact, e.g. in a fluidized bed, with a hot oxygen-containing gas. The process of this type is described in European patent application No. 74 258. Operation of a fluidized bed apparatus for this process is, however, difficult because the particle size of this type of material is usually too small, typically 10-100 microns, to from a fluidized layer, unless the fluidization gas velocity is so low that the process is uneconomical.

It might be possible to enlarge the particle size by agglomeration or pelletizing prior to the fluidized bed treatment. Such particle size enlargement processes are conventionally made by admixing of suitable binders in connection with mechanical treatment, e.g. on a rotating disc or by compacting.

This would be a possible solution to the problem, and an increased particle size may also be desirable with respect to handling and various applications of the material. Such further processing steps, however, add to the total processing costs, and it is therefore also an object of the present invention to obtain an agglomerated product without adding further processing steps. In other words, in the present invention the process of converting sulfite into sulfate and agglomeration of the material are made simultaneously.

The material which may be treated according to the invention have to a certain extent glassy properties and as will be explained later, the present invention makes use inter alia of these properties, which imply that the particles become sticky at elevated temperatures and may thereby form agglomerates. The particles will begin becoming sticky upon heating above a temperature which in the present specification and claims is termed the agglomeration temperature of the material.

SUMMARY OF THE INVENTION

The method according to the invention is described in the attached claims. The method is carried out in a fluidized bed in which the particulate FGD by-product is contacted with an oxygen-containing gas used as the fluidizing medium, and the inventive features are that the temperature of the fluidizing gas is below the agglomeration temperature of the particulate material, the temperature of the fluidized bed is maintained above the agglomeration temperature of the particulate material, and the fluidizing gas together with particles entrained therein, during its passing through a space immediately above the fluidized bed is cooled to below the agglomeration temperature.

In the present specification and in the attached claims the term fluidized bed denotes a layer in which particulate material is kept fluidized in an upward stream of gas or air.

The agglomeration temperature for this type of material is normally above 600° C., while there is a reasonable reaction velocity of the sulfite oxidation already at slightly lower temperatures. Therefore if the temperature of the fluidized bed is above the agglomeration temperature, oxidation and agglomeration will take place simultaneously.

The reason why it is possible to maintain a bed temperature that is higher than that of the fluidizing gas is that the conversion of sulfite into sulfate is an exothermic reaction. With the sulfite contents normally present in this type of material and under suitable operating conditions the heat of reaction alone is sufficient to allow the use of air at ambient temperature as fluidizing gas. If, however, the sulfite content of the particulate material is relatively small it may be necessary to heat the fluidizing gas or to add additional heat to the fluidized bed by combustion of fuel in a burner placed in or outside the bed.

Taking as an example an FGD by-product derived from a spray dryer absorption process using calcium hydroxyde as absorbent the following table shows the chemical reactions taking place during the process according to the invention, the heat of reaction, and the approximate reaction temperature ranges:

|  | $\Delta H$ kcal/mole | Temperature range |
|---|---|---|
| $CaSO_3 \cdot \frac{1}{2}H_2O \rightarrow CaSO_3 + \frac{1}{2}H_2O$ | 6.87 | 370–390° C. |
| $CaSO_4 \cdot 2H_2O \rightarrow CaSO_4 + 2H_2O$ | 26.07 | 130–150° C. |
| $Ca(OH)_2 \rightarrow CaO + H_2O$ | 25.7 | above 470° C. |
| $CaSO_3 + \frac{1}{2}O_2 \rightarrow CaSO_4$ | −65.8 | above 550° C. |

The particles entrained in the fluidizing gas as they leave the fluidized bed have a temperature above the agglomeration temperature and therefore have a tendency to stick to free surfaces of the fluidized bed reactor and the connecting ducts; but by cooling the fluidizing gas and the entrained particles just after leaving the fluidized bed to below the agglomeration temperature it is ensured that the particles may be carried away with and separated from the gas in a suitable collector without forming deposits on the inner surfaces of the equipment.

The fluidizing gas is introduced into the fluidized bed through a gas distributor plate which may be a perforated plate. By keeping the temperature of the fluidized bed below the agglomeration temperature it is ensured that the temperature of the gas distributor plate is also kept below the agglomeration temperature so that particles in the fluidized bed will not form deposits in the plate.

The entrained particles are separated from the cooled gas in a particle collector and at least part of the collected particles are recycled to the fluidized bed.

A suitable way of cooling the spent fluidizing gas leaving the fluidized bed is by heat exchange with the particulate material. This material, because of its small particle size, may be dispersed into the space immediately above the fluidized bed (termed the free-board of the fluidized bed apparatus) either through an inlet tube or by means of a rotary disperser. In this way substantially all the particulate material supplied to the space above the fluidized bed is preheated and, together with particles that may be blown off from the fluidized bed, carried by the cooled gas into the particle collector.

Alternatively, the spent fluidizing gas may be cooled by introduction of cooling air into the space immediately above the fluidized bed.

Also a combined dispersion of particulate material and introduction of cooling air into the free-board may suitably be applied to achieve the required cooling of the gas and entrained particles leaving the fluidized bed.

The mechanism of the particle agglomeration is not known. The glassy nature of these materials is undoubtly important. As mentioned above, the particle become sticky when heated to temperatures above approximately 600° C. However, the oxidation reaction of sulfite compounds is accompanied by a change in the crystal structure. The oxidation reaction of this type of sulfites will begin at temperatures around 550° C. but at higher temperatures the reaction velocity will increase. It is believed that, at the temperatures at which the fluidized bed is operated according to the invention, the sintering processes and the recrystallisation processes may participate simultaneously in the particle agglomeration.

Agglomeration is increased by the presence of alkali metal salts and other compounds melting at relatively low temperature and promoting the formation of glassy material. In case such promoting compounds are not present in sufficient amounts in the spent FGD absorbent to be treated, they may be added thereto, e.g. in the form of alkali metal carbonate, sulfate or chloride or as bentonite.

Depending on the properties of the specific material being treated a deficiency of large particles in the fluidized bed may develop. In such case it may be necessary to recycle a part of the oxidized product to the fluidized bed as seed material after proper classification. If on the other hand there is a deficiency of smaller particles in the bed, recycled material may be subjected to grinding. Such means for controlling the particle size in the fluidized bed are known to a man skilled in the art.

It has been found that injection of steam into the fluidized bed is a suitable means for breaking down agglomerates which have grown too large. Steam injection may therefore constitute of further measure for controlling particle size in the fluidized bed.

The oxidized product which, due to the agglomeration taking place in the fluidized bed, has a larger average particle size than the particulate feed material may be satisfactory for disposal or industrial applications, but if a less dusting product is required the oxidized product may be classified by conventional methods into a coarse final product and a fines fraction which may be recycled to the fluidized bed.

The process will be explained with reference to treatment of particulate materials derived from FGD processes by spray drying absorption using slaked lime slurry as absorbent, but it is understood that the invention, which is defined by the attached claims is applicable to any dry particulate sulfite containing material derived from FGD processes using alkaline earth metal compounds as absorbent. The proportion of fly ash in the particulate material should preferably not exceed 30% and should more preferably be below 15-20%. Consequently it is preferred to precollect at least a part of the fly ash, e.g. in an electrostatic precipitator, prior to absorption.

BRIEF DESCRIPTION OF THE DRAWING

The invention will now be described in more detail with reference to the attached figures wherein.

DESCRIPTION OF PREFERRED EMBODIMENTS

Figure 1:
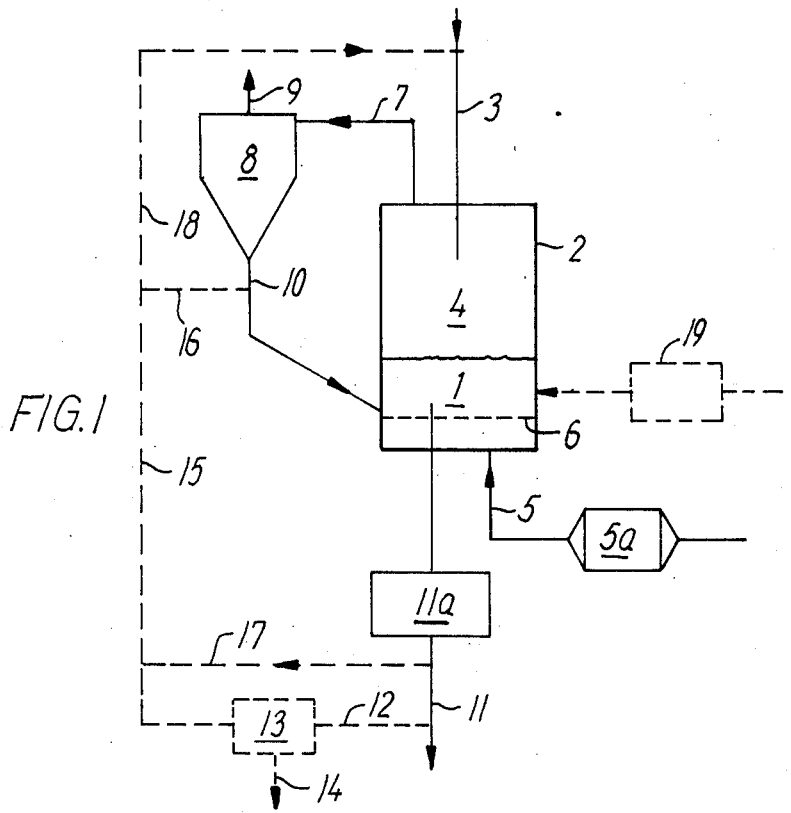
FIG. 1 is a schematic flow diagram illustrating an embodiment of the process according to the invention, in which cooling of the gas and entrained particles in the freeboard of the fluidized bed reactor is performed by introduction of particulate material.

In FIG. 1 a fluidized bed of dry solid material 1 is maintained in a reactor 2. Dry particulate material derived from a FGD process and containing some fly ash is supplied e.g. pneumatically to the freeboard of the fluidized bed reactor through a conduit 3 and dispersed in a space 4 immediately above the fluidized bed. Fluidizing gas is supplied through a gas destributor 6 into the fluidized bed 1. The fluidizing gas together with entrained particles is conducted from the reactor through a conduit 7 to a particulate separator e.g. cyclone 8, and cleaned gas leaves the separator through an outlet 9. Particles separated in the cyclone are supplied via a conduit 10 to the fluidized bed.

Oxidized product is recovered from the fluidized bed through line 11 and a powder cooler 11a. If a non-dusting product is required the oxidized product may be supplied through line 12 to a conventional separator 13, where it is classified into a coarse fraction taken out through line 14 and a fines fraction, which is recycled direct into the fluidized bed through line 15 and 16.

If there is a deficiency of large particles in the fluidized bed 1 part of the oxidized product leaving the fluidized bed may be taken out through line 17 and recycled to the fluidized bed through line 15 and 16 or via lines 15 and 18 to the feed conduit 3.

The fluidizing gas may be air or an other oxygen-containing gas. Usually the oxygen contents shall be at least 5 vol-%, and it may be advantageous to use a fluidizing gas having higher contents than atmospheric air. This especially applies when the spent absorbent to be treated has a relatively low sulfite content.

Normally air at ambient temperature may be used as fluidizing gas but if the sulfite content of the particulate material is relatively low so that the heat developed in the fluidized bed is insufficient to maintain the temperature of the fluidized bed it may be necessary to heat the fluidizing gas in the heater 5a. During start-up of the process it may further be necessary to supply additional heat to the fluidized bed e.g. by means of a fuel burner 19.

Figure 2:
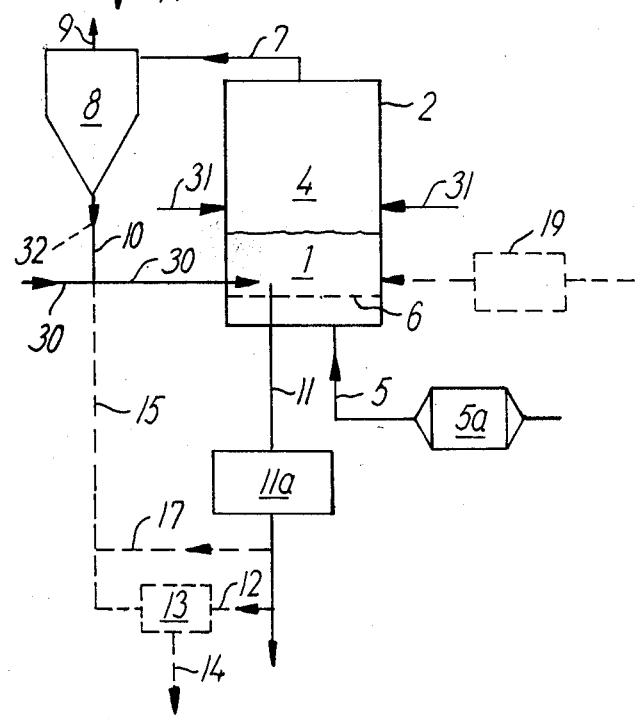
FIG. 2 is a schematic flow diagram illustrating an other embodiment of the process according to the invention, wherein cooling the freeboard of the fluidized bed reactor is performed by blowing cooling air into the freeboard just above the fluidized bed.

In FIG. 2 the same numerals are used as in FIG. 1 for the same parts.

In this embodiment particulate material is supplied direct to the fluidized bed 1 through line 30. The space 4 immediately above the fluidized bed is cooled by introduction of cooling air through lines 31 into the space 4.

At least part of the particles separated in the cyclone 8 are recycled to the fluidized bed 1 through feed line 30. A fraction may be removed through line 32.

As in FIG. 1 the oxidized product leaving the fluidized bed 1 through line 11 and powder cooler 11a may be satisfactory as final product, or it may be fractionated in separator 13 and the fines returned to the fluidized bed.

A part of the oxidized product may be recycled as seed material to the fluidized bed through lines 17, 15 and 30.

In operation typical analysis of the material in various stages of a process according to FIG. 1 may be as shown in Table I. Column 1 represents the particulate material to be treated. In this case the FGD by-product was collected from a flue gas cleaning system where substantially all fly ash had been separated from the flue gas prior to spray drying absorption. Column 2 represents material which is separated in the cyclone 8. Column 3 represents the oxidized product recovered from the fluidized bed 1 and fractionated in separator 13.

TABLE I

|  | 1 | 2 | 3 |
|---|---|---|---|
| $CaSO_3 \frac{1}{2}H_2O$ | 0.65 | | |
| $CaSO_3$ | | 0.673 | |
| $CaSO_4 2H_2O$ | 0.15 | | |
| $CaSO_4$ | | 0.137 | 0.821 |
| $Ca(OH)_2$ | 0.10 | | |
| $CaO$ | | 0.084 | 0.077 |
| Inert | 0.10 | 0.111 | 0.102 |
| 0.5–5 mm | | | 100% |
| Up to 100 microns | 100% | 100% | |

The invention also relates to a fluidized bed reactor suitable for carrying out the method according to the present invention.

Figure 3:
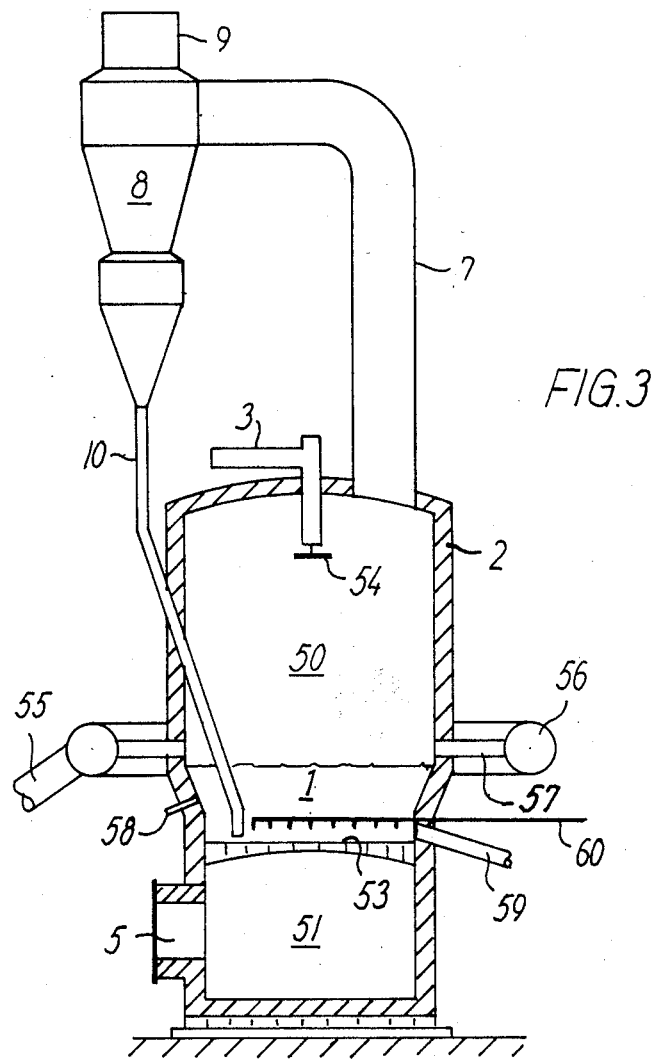
FIG. 3 is a schematic section of a fluidized bed reactor according to the invention, in which both cooling measures shown in FIG. 1 and FIG. 2, resp. are utilized.

The fluidized bed reactor will now be described with reference to FIG. 3.

A fluidized bed 1 is maintained in a mainly cylindrical reactor 2 which is devided into an upper chamber 50 (the freeboard) and a wind box 51 by a gas distributor plate 53 of a conventional design suitable for high temperature applications.

Fluidizing gas which may be ambient air is supplied through a tube 5 to the wind box 51.

Dry particulate material is supplied via line 3 to a powder distributor 54, e.g. a horizontal rotating disc driven by a motor not shown.

Cooling air is supplied via a pipe 55 to a ring tube 56 from which a series of radially directed pipes 57 directs cooling air into the space above the fluidized bed 1.

Thus in the reactor shown the spent fluidizing gas in the space above the fluidized bed is cooled by direct heat exchange with both particulate material dispersed from the disc 54 and cooling gas from pipes 57.

By cooling of the gas and the particles entrained therein above the fluidized bed, said particles will loose their tendency to stick to the free inner surfaces of the reactor and outlet duct. The inner walls of the reactor below the surface of the fluidized bed are free of deposits apparently due to the mechanical action of the fluidized particles.

The spent fluidizing gas together with entrained particles leaves the reactor through a duct 7, which is connected to a cyclone separator with a gas outlet and a powder outlet connected to a tube 10 for transport of the separated particles into the fluidized bed 1.

For start of the process hot fuel combustion gasses are supplied to the reactor through a supply pipe 58, and preheated air is introduced through 5.

The oxidized and agglomerated particulate material is recovered through an outlet duct 59.

A pipe 60 makes it possible to inject stream to the lower part of the fluidized bed to obtain a desired breakdown of oversize particles.

Figure 4:
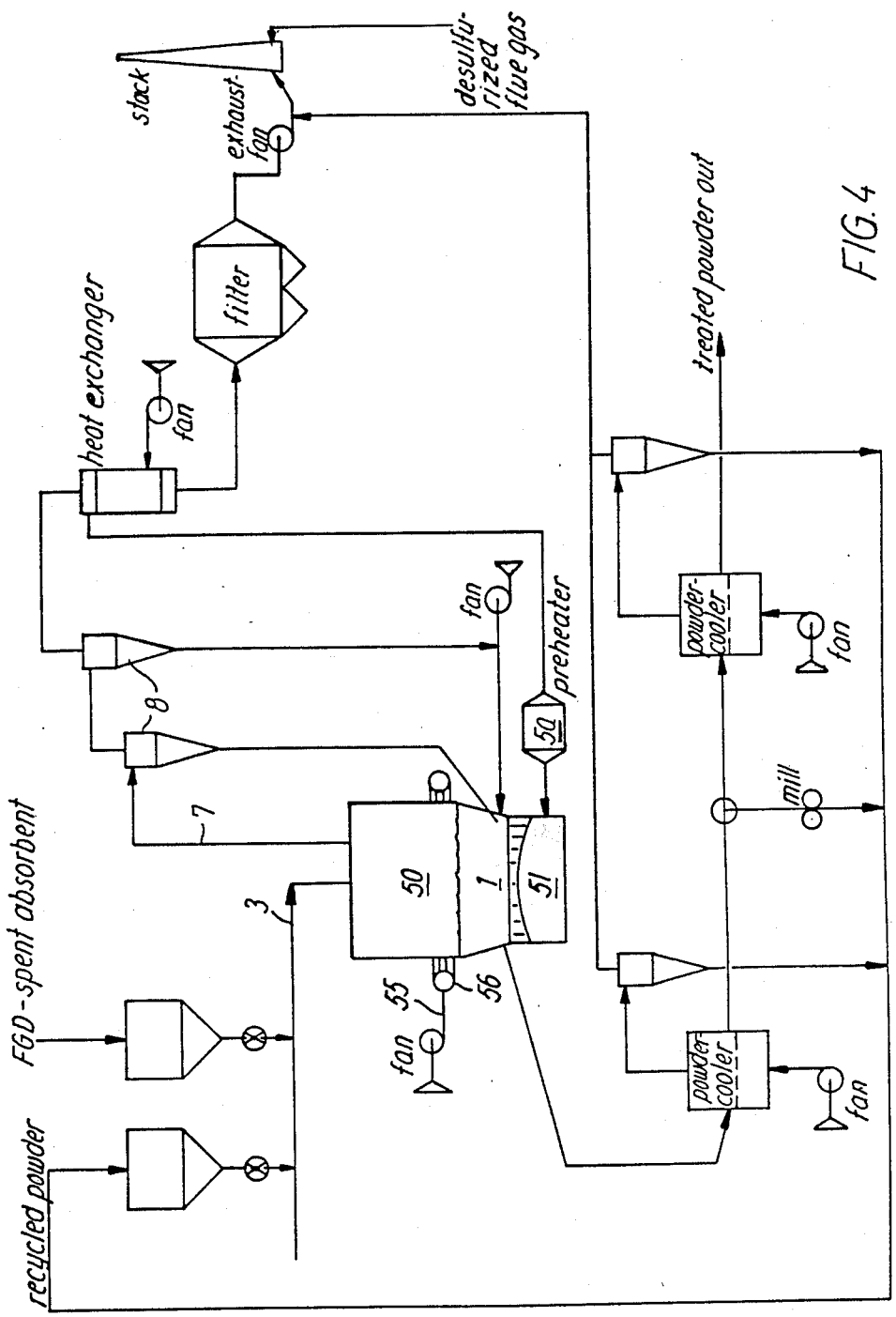
FIG. 4 is a schematic flow diagram showing an embodiment for utilization of heat energy liberated by the oxidation.

FIG. 4 with the legends thereon visualizes how the heat liberated by the oxidation in an embodiment of the invention is used to increase the temperature of the desulfurized flue gas before emission thereof into the atmosphere.

By most desulfurization processes the temperature of the flue gas has been reduced and the moisture contents thereof has been increased, which means that under certain weather conditions the release of the desulfurized gas through the stack creates an undesirable visible plume. It has surprisingly turned out that dependent on the sulfite contents of the flue gas and other parameters, the heat generated by the oxidation of the sulfite in the spent absorbent may be sufficient to provide a sufficient reheating of the desulfurized flue gas and at the same time ensure a sufficient preheating of the fluidizing and oxidizing gas, when desired.

Figure 5:
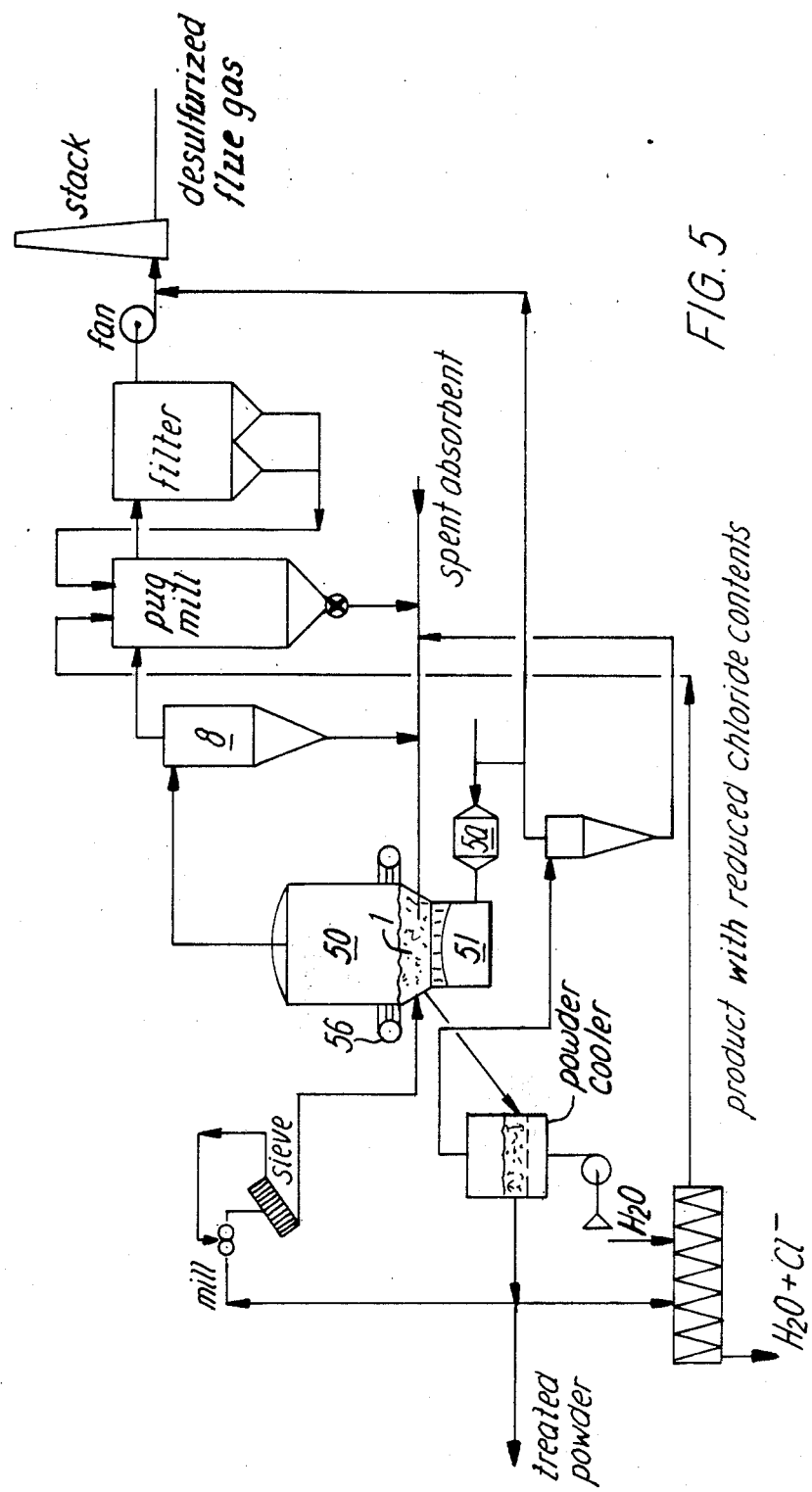
FIG. 5 is a schematic flow diagram showing an embodiment which includes a chloride removing treatment.

In FIG. 5 is depicted a further embodiment of the invention in which the chloride content of the treated particulate materials is decreased by leaching a portion thereof with water. The plant used for the chloride removal consists of apparatuses known per se. The wet material from which the chloride has been washed out is at least partially dried before it is recycled to the fluid bed together with spent absorbent to be treated. Said drying is performed by contacting the wet material with exhaust products from the fluid bed.

As it appears also the embodiment of FIG. 5 encompasses reheating of the desulfurized flue gas and preheating of the fluidizing gas. However, it is within the scope of the present invention to exclude one or both of said features, and it is to be understood that any combination of the features which are shown on the drawings should be contemplated as forming part of the invention.

The process according to the invention is illustrated by means of the following example.

EXAMPLE

In a plant as described in FIG. 4 particulate material derived from a line based spray dryer absorption process was treated. The composition of the material is shown in Table II. The particle size was 4–60 micron, the average particle size 25 micron.

2000 kg/h of raw material together with 280 kg/h of recycled material were supplied through conduit 3 to a 1.4 m$^2$ fluidized bed reactor. Fluidizing gas which was atmospheric air heated to 300° C. was supplied to the fluidized bed at a rate of 1800 kg/h providing a fluidizing velocity at 1 m/sec. The temperature of the fluidized layer was 800° C.

3820 kg/h of a suspension of particles entrained in gas at 440° C. left the reactor through conduit 7 and altogether 3620 kg/h of solids were collected in cyclones 8 and reintroduced at a temperature of 400° C.

2260 kg/h of oxidized product was extracted from the reactor and after cooling classified into 1880 kg/h of a final product fraction with a mean particle size of 1.5 mm and 380 kg/h of a fines fraction which was recycled to the top of the reactor.

The composition of the oxidized product is shown in Table II.

TABLE II

|  | Spent Absorbent % | Oxidized Product % |
|---|---|---|
| $CaSO_3 \tfrac{1}{2}H_2O$ | 48 | |
| $CaSO_4\ 2H_2O$ | 16 | |
| $CaCl_2\ 2H_2O$ | 7 | |
| $Ca(OH)_2$ | 10 | |
| $H_2O$ | 1 | |
| Inert | 18 | 19 |
| CaO | | 8.0 |
| $CaSO_4(\beta)$ | | 67 |
| $CaCl_2$ | | 5.6 |
| Total | 100 | 100 |

We claim:

1. A method of treating a dry particulate material with an oxygen-containing gas in a fluidized bed, said material originating from a flue gas desulfurization process in which process a basic calcium compound has been used as an absorbent, said particulate material containing calcium sulfite and calcium sulfate and possible fly ash originally present in the flue gas wherein a substantial part of said sulfite is converted into sulfate by an exothermic reaction, comprising the steps of
   (a) continuously feeding the particulate material into and removing treated material from the fluidized bed;
   (b) introducing into the fluidized bed fluidizing gas at a temperature below 600° C.;
   (c) adjusting particulate material flow rate through the fluidized bed, and the fluidizing gas temperature and flow rate to maintain the fluidized bed temperature above 600° C.;
   (d) cooling the gas together with particles entrained therein during its passing through a space immediately above the fluidized bed to a temperature below 600° C.;
   (e) separating the cooled gas from said entrained particles, and
   (f) supplying at least part of said entrained particles to the fluidized bed.

2. A process according to claim 1, wherein cooling of the gas is made by direct heat exchange with particles dispersed in the space immediately above the fluidized bed.

3. A process according to claim 1, wherein cooling of the gas is made by introducing air into the space.

4. A process according to claim 1, wherein a part of the treated material is recycled to the fluidized bed as seed material.

5. A process according to claim 1 or 2, wherein the treated material is classified as a final product and the fines fraction recycled to the fluidized bed.

6. A process according to claim 5, wherein the particulate material before treatment in the fluidized bed has a particle size below 100 microns, the final product 0.5–5 mm, and the fines fraction below 500 microns.

7. A process according to claim 1 or 2 wherein the temperature of the fluidizing gas in the space above the fluidized bed is cooled to 400°–500° C.

8. A process according to claim 7, wherein the fluidized bed temperature is 700°–850° C.

9. A process according to claim 7, wherein the particulate material is retained in the fluidized bed during a residence time of 5–500 seconds.

10. A process according to claim 1, wherein either the gas leaving the fluid bed or hot air obtained by cooling the treated particulate material or both is utilized either to increase the temperature of the desulfurized flue gas before release thereof to the atmosphere or to preheat the fluidizing gas or both.

11. A process according to claim 1, wherein a portion of the treated material is leached with water to remove chloride therefrom, whereupon the material of reduced chlorids contents is at least partly dried by contact with hot exhaust products from the fluidized bed and is combined with spent absorbent serving as starting material in the process.

12. A process according to claim 1, wherein steam is injected into the fluidized bed to aid in particle size control.

* * * * *